(12) United States Patent
Focht

(10) Patent No.: US 6,760,154 B1
(45) Date of Patent: Jul. 6, 2004

(54) MICROSCOPE SYSTEM WITH CONTINUOUS AUTOFOCUS

(75) Inventor: Daniel C. Focht, Butler, PA (US)

(73) Assignee: Biotechs, Inc., Butler, PA (US)

( * ) Notice: Subject to any disclaimer, the term of this patent is extended or adjusted under 35 U.S.C. 154(b) by 34 days.

(21) Appl. No.: 10/161,973

(22) Filed: Jun. 4, 2002

(51) Int. Cl.$^7$ ................................................ G02B 21/00
(52) U.S. Cl. ........................ 359/383; 359/368; 359/372
(58) Field of Search ......................... 359/363, 368–390; 250/201.3

(56) References Cited

U.S. PATENT DOCUMENTS

| | | | | |
|---|---|---|---|---|
| 4,935,612 A | * | 6/1990 | Bierleutgeb | ............... 250/201.2 |
| 5,054,896 A | * | 10/1991 | Margolis | ..................... 359/379 |
| 5,270,527 A | * | 12/1993 | Salzmann | ................. 250/201.3 |
| 6,172,349 B1 | * | 1/2001 | Katz et al. | ................ 250/201.3 |

* cited by examiner

*Primary Examiner*—Thong Q. Nguyen
(74) *Attorney, Agent, or Firm*—Robert L. Potter

(57) ABSTRACT

A microscope system whereby microscopic specimens can be continuously and autonomously maintained in focus without sacrifice to the optimum resolution of the objective. The system achieves focus by splitting the image emerging from the objective lens into two pathways, a focus test pathway and an observational pathway. Each pathway contains an electronically indexed lens module. The focus test pathway lens module is continuously varied, resulting in focal variations in its projected image. The focus test pathway lens position is correlated with the focus camera image for optimum focus. The indexed value for the optimum focus, obtained from the focus test pathway, is then compared to the index value of the lens module in the observational pathway where immediate correction is applied if necessary. Therefore, time and three-dimensional information which would be lost with conventional focusing is acquired, processed, and utilized without negative effects to the observational path.

3 Claims, 2 Drawing Sheets

MICROSCOPE SYSTEM WITH CONTINUOUS AUTOFOCUS

BACKGROUND OF THE INVENTION (a) Field of the Invention

This invention relates to a continuous autofocusing microscope which has a fixed distance between the objective lens and the viewing lens and which has a fixed distance between the objective lens and the specimen under observation. More specifically, the invention discloses a system that uses multiple afocal variator system (avs) modules to control focus.

Each avs module is equipped to accept an electrical signal to activate means to reposition the lens elements within the module. One avs module is positioned in an optical pathway for the purpose of determining correct focus. For this purpose, the avs module in the focus test pathway is continuously moved around the correct focus position. When the correct focus position is determined in the focus test pathway, that position is then electronically transmitted to an avs module located in a separate pathway through which the microscope user views the image. The avs module in the viewing pathway is therefore repositioned only on receipt of a signal from the focus test pathway mechanism and only when necessary to correct the focus. Movement in the avs module in the viewing pathway is thus minimized to that essential to maintain correct focus The effect of the oscillatory movement in the avs module located in the focus test pathway is confined to the avs module in the focus test pathway. Therefore, the process of searching for focus does not affect the viewing pathway.

(b) Discussion of the Prior Art

In conventional microscopy, focusing is achieved by changing the distance of the objective lens relative to the specimen. This means either that the specimen is fixed and the objective lens is moved. Or, it means that the objective lens is fixed and the specimen is moved. Correct focus is achieved only when the objective lens is at the proper working distance relative to the specimen being examined. It is important to note that the aforementioned method of focusing enables the objective to produce the maximum resolution when this proper working distance is maintained. It is possible to focus an image of an object at a distance other than the optimal working distance of the objective by moving the projected image plane either closer or farther away from its optimal position. However, the optimal resolution of the objective is sacrificed.

In a conventional microscope, if a prism or beamsplitter is used to split the light that passes through the objective lens into separate pathways, then movement of the objective lens or of the specimen changes the focus in both pathways simultaneously. The image in Pathway A cannot be manipulated without simultaneously altering or disrupting the image in Pathway B. Autofocusing systems have been disclosed in which the objective lens or the specimen is automatically moved, without observer intervention, to ascertain a correct distance between the objective lens and specimen. Such systems are disadvantageous because the image is not in focus during the autofocusing process. Therefore, valuable observation time and optical information from the specimen under examination is wasted during the conventional focusing process.

As the objective lens-to-specimen distance is changed, the angularity of the image-forming rays changes in the entire length of the back focal plane. Therefore, the image is continuously in and out of focus during the focusing process.

The present invention provides an attractive solution to these problems of conventional microscopy, described above. The solution uses the properties of the afocal variator system, as invented by Margolis and disclosed in U.S. Pat. No. 5,452,133 ("Variator Optical System.") No claim, of course, is made in this application to the variator optical system itself.

In the present invention, the specimen and objective lens are maintained at a fixed distance. The viewing lens or viewing camera is at a fixed distance from the object being viewed. In conventional microscopy, this arrangement would make it impossible to make corrections to focus the microscope.

In the invention, however, a prism or beamsplitter is used to split the image coming from the objective lens into multiple pathways. Each pathway has a different purpose. One such pathway is utilized as the "focus test pathway." Light in the focus test pathway is passed through an afocal variator system (avs) module. It is a property of the avs module that elements within the module can be repositioned to adjust the focus of the image after it passes through the objective lens. This enables focus to be obtained even though the distance between the specimen and objective lens, and between the objective lens and the viewing lens, is fixed.

The avs module in the focus test pathway, therefore, can be positioned and repositioned, or even continuously cycled, and will pass the resulting images to a focusing camera. The focusing camera is in communication with a focusing means which evaluates the position of the avs module using readily available strategies of image analysis for either analog or digital signals, such as contrast optimization techniques, or other known techniques for focus determination to ascertain the correct focus position of the avs module.

When a correct focus position is determined by correlating the mechanical position of the avs module in the focus test pathway with the resulting image quality in the focusing means, then an electronic signal is sent to a separate avs module positioned in a separate pathway coming from the common prism or beamsplitter. This light pathway is called the "viewing pathway." The image in this viewing pathway passes through another avs module in the viewing pathway which is set at the correct focus position as determined by the focusing means in the focus test pathway. Movement of the avs module in the focus test pathway, however, does not in any manner affect the correctness of the focus of the avs module in the viewing pathway. The focusing means, which controls the motion of the avs module in the focus test pathway, can be set to cause as frequent movement or cycling of the avs module in the focus test pathway as the user may desire. Continuous searching or continuous random movement of the avs module in the focus test pathway is possible, all without disruption of the stability of the focus of the viewing pathway.

Thus, the properties of the afocal variator system enable the creation of two or more optical pathways in the microscope in which the light in one pathway can be manipulated, and focus changed, without disruption of the light in other pathways.

The use of multiple afocal variator systems in multiple optical pathways to attain autonomous focus is, in the view of the inventor, novel and not anticipated by prior art. Margolis, the inventor of the afocal variator system, has disclosed a method of continuously focusing a single avs module positioned between a front lens and a rear lens at a fixed distance. To the knowledge of the inventor of this application, however, there has been no public disclosure of the use of multiple afocal variator systems positioned in multiple light pathways within a compound microscope to provide a means of automatic focus where light from the objective lens is split into multiple paths in such a manner that one of the light paths is used as a focus test pathway to provide intelligent corrections to other pathways All prior art known to the inventor relative to autofocusing microscope systems involve repositioning of either the objective lens or the specimen itself.

SUMMARY OF THE INVENTION in view of the foregoing, it is an object of the present invention to provide a microscope system with continuous autofocusing in which the distance between objective lens and viewing lens is fixed. It is the purpose of this invention to achieve continuous autofocusing but with a fixed distance between objective lens and viewing lens by incorporating multiple afocal variator system (avs) modules into a microscope system.

It is the object of this invention to provide a microscope in which changes in focus do not require changes in the distance between the objective lens and viewing lens, and in which focus changes, therefore, do not in any manner disturb the image of the object under examination.

It is another object of this invention to provide a microscope with continuous autofocus that does not require frequent and disruptive changes in the optical pathway through which the observer is viewing the object under examination. It is an object of this invention to provide a microscope with continuous autofocus in which the autofocus system makes only the minimum adjustments in focus necessary to correct focus, and not otherwise.

It is an object of this invention to provide a microscope system that has a separate focus test pathway and viewing pathway both containing their own avs modules so that various methods of testing focus can be employed without disturbing the focus of the viewing pathway. It is an object of this invention to permit the focusing means to adopt an unlimited variety of strategies for testing focus and collecting optical information from the specimen under examination, but without causing any disruption in the correct focus maintained in the viewing pathway by the avs module in the viewing pathway.

It is an object of this invention to provide a continuous autofocusing microscope into which can be incorporated focus testing strategies which enable the focusing means to predict the correct focus position and to move the avs module in the viewing pathway into the correct focus position just as the material being examined moves from a peripheral location within the field of view to the central field of view.

It is another object of the present invention to provide a continuous autofocusing microscope in which the focusing camera and the focusing means determine the correct focus of light in one wavelength, but can then calculate the correct focus for the avs module in the viewing pathway for a different wavelength altogether. In this manner, living biological specimens, which can be damaged or killed by prolonged exposure to certain wavelengths of light, may nevertheless be briefly examined at such harmful wavelengths in this microscope, because the focus test pathway can determine the correct focus in a harmless wavelength, calculate the correct focus for a harmful wavelength, and then move the avs module in the viewing pathway into correct focus position for that harmful wavelength. The observer can then briefly examine in the harmful wavelength with the microscope already prefocused for that harmful wavelength.

These and other objects of the present invention will become apparent to those skilled in the art from the following detailed description, showing the contemplated novel construction, combination and elements as herein described, and more particularly defined by the appended claims, it being understood that changes in the precise embodiments of the herein disclosed invention are meant to be included as coming within the scope of the claims, except insofar as they may be precluded by prior art.

DESCRIPTION OF THE DRAWINGS

The accompanying drawings illustrate the preferred embodiments of the present invention according to the best modes presently devised for the practical application of the principles of the invention.

DESCRIPTION OF THE PREFERRED EMBODIMENTS

Figure 1:
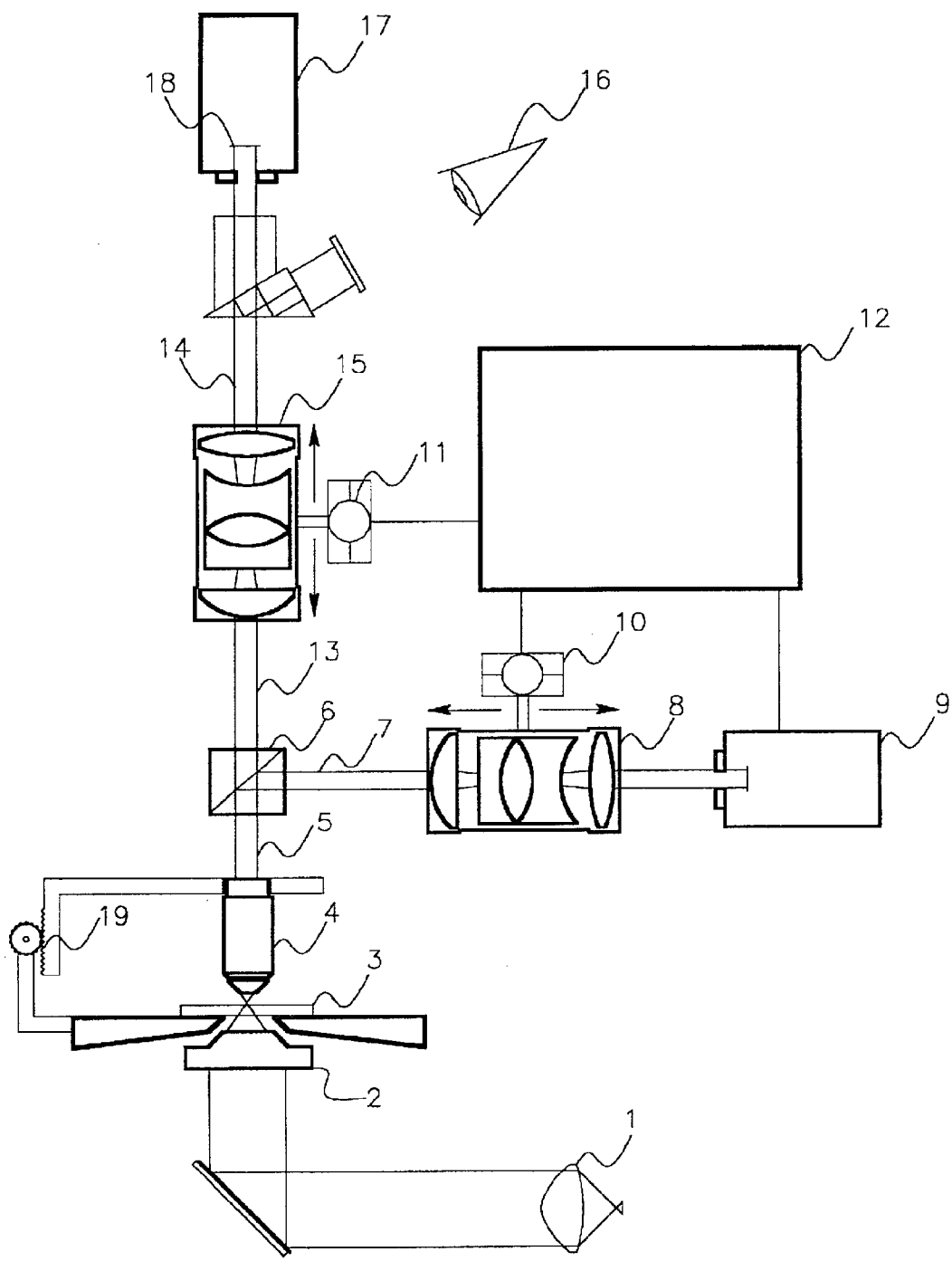
FIG. 1 illustrates a diagrammatic view of the subject of this invention, an autofocus microscope with multiple afocal variator system modules.

The specimen can be illuminated from a number of conventional light sources and methodologies. FIG. 1 shows trans-illumination. Light from source (1) passes through a condenser (2) then through the microscope slide containing the specimen or object under examination (3). The specimen introduces imperfections into the light path. These imperfections are formed into an image path by the objective lens (4). The light path (5) exiting the objective lens (4) contains image information. This image path is split by a beamsplitter (6) into multiple pathways, one such path (7) called the "focus test pathway" directed into a motorized (10) afocal variator module (8) then into a focus testing camera (9). The focus testing cameras'signal is correlated by control electronics (12) to the position of the motorized (10 ) afocal variator module (8) for the purpose of identifying a positional value using either analog or digital signal processing. This positional value is compared to the known position of the motorized (11) afocal variator module (15). If a correctional change is needed, the correct value, determined by the test pathway evaluation, will be sent to the motorized (11) afocal variator module (15) thereby providing continuous focus correction without wasting time being out of focus while finding focus. Returning to the beamsplifter (6), another image pathway (13) passes through another motorized (11) afocal variator module (15) where the focus of the image has been corrected by motor (11) receiving instructions from the electronics control system (12). The image path (14), correctly focused, is then directed to, either or both, human (16) or camera (17) observation. The distance between the objective lens (4) and the final image plane (18) remains fixed. Manual focus of the microscope can always be achieved by conventional means (19) of adjusting the distance between the specimen (3) and objective (4).

Figure 2:
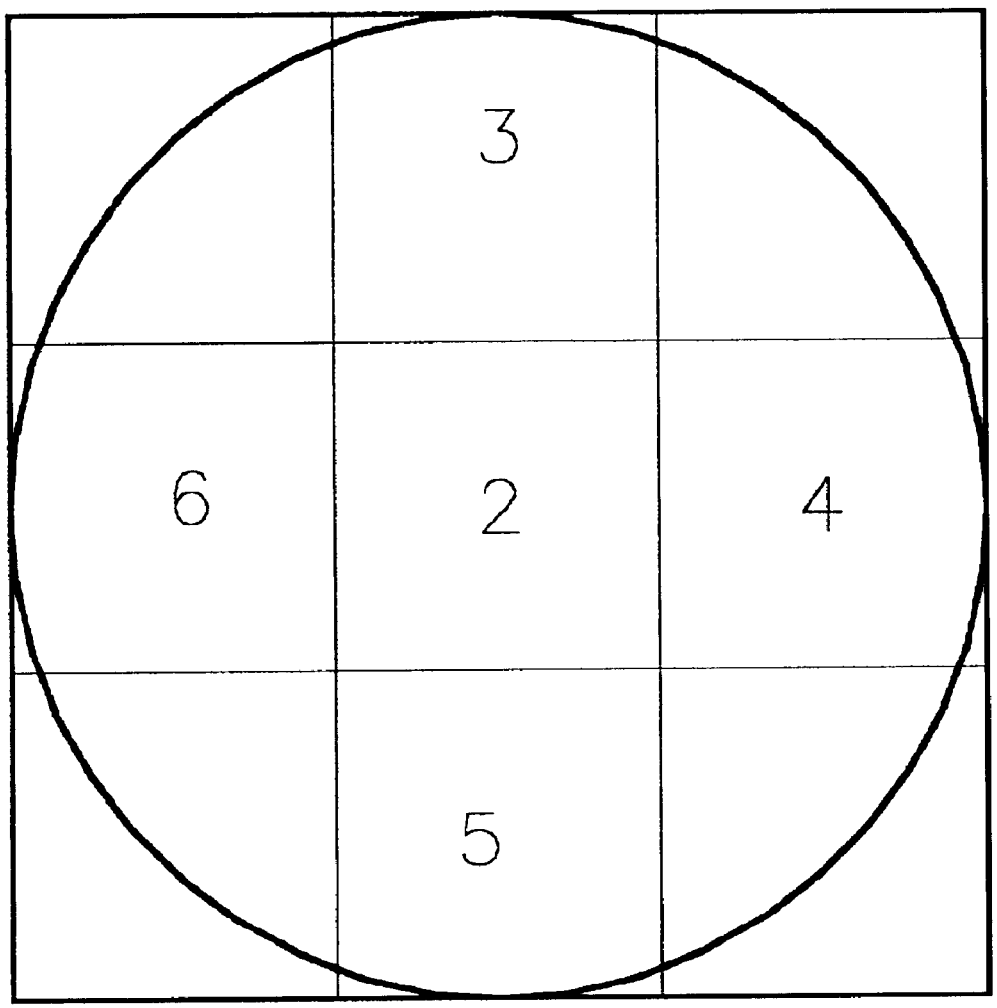
FIG. 2 illustrates a diagrammatic view of the possible relationships between the field of view (FOV) of the objective lens, the FOV of the focusing camera, and the FOV of an optional camera or human visual field.

Referring to FIG. 2, there is depicted in diagrammatic fashion the field of view (FOV) of the viewing prism/lens assembly (or the image acquisition camera)(FIG. 1, Item 17). The FOV of the focusing camera is depicted as a rectangle (2) within the FOV of the viewing prism/lens assembly. That FOV of the focusing camera has been arbitrarily subdivided into five ranges of interest (ROI), labeled Central ROI (2), North ROI (3), East ROI (4), South ROI (5), and West ROI (6). The focusing camera can be made to examine different ROIs (North, East, South West, or Central) depending on the manner in which the microscope is being used. For example, if the material under examination is in motion from west to east, the focusing camera can be made to examine the West ROI. In this matter, the correct focus position can be transmitted from the focusing means (FIG. 1, Item 12) to the viewing path avs module (FIG. 1, Item 15.) before the material arrives at Central ROI, which is being viewed by the observer. Similarly, the focusing camera can be made to examine successive ROIs peripheral to the Central ROI, providing a three-dimensional analysis of focus for material surrounding the Central ROI. With information concerning direction of movement of the material under examination, the avs module in the viewing pathway (FIG. 1, Item 15) can be positioned at correct focus as material moves from a peripheral location into the Central ROI.

What is claimed is:

1. A microscope system with continuous autofocus, comprised of:

a compound lens system in which an objective lens is mounted at a fixed distance from a specimen under observation;

a prism or beamsplitter device which splits the image from the objective lens into two optical pathways;

multiple afocal variator system modules positioned in the optical pathways created by the beamsplitter, with one optical pathway being used as a focus test pathway and the other optical pathway being used as an observational or quantitative imaging pathway;

a focusing camera or detector receiving images from the afocal variator system module positioned in the focus test pathway which is in communication with a focusing means;

a focusing means which:

provides electronic signals to the afocal variator system module in the focus test pathway, directing the movement of that afocal variator system module to adopt various strategies for testing focus;

analyzes the images received from the focusing camera or detector for the purpose of determining an optimum focus position; and communicates the optimum focus position to the afocal variator system module in the observational or quantitative imaging pathway.

2. The microscope system of claim 1 in which the images from the focusing camera or detector in the focus test pathway can be analyzed in three dimensions in a variety of regions of interest within the focusing camera's field of view, thereby providing data that can be used to predict the optimum focus for a living specimen that moves within or into the field of view of the observational pathway under its own power, or for both living and non-living specimens that are moved within or into the field of view of the observational pathway by mechanical repositioning of the specimen.

3. The microscope system of claim 1 in which the focusing means determines the optimum focus for a specimen when it is subjected to a user-defined wavelength of light in the focus test pathway and then determines an optimum focus position for the afocal variator system module in the observational or quantitative imaging pathway for that same user-defined wavelength of light or some other wavelength of light selected by the user.

* * * * *